United States Patent [19]

Zhilyaev

[11] Patent Number: 6,137,911
[45] Date of Patent: Oct. 24, 2000

[54] TEST CLASSIFICATION SYSTEM AND METHOD

[75] Inventor: Maxim Zhilyaev, Palo Alto, Calif.

[73] Assignee: The Dialog Corporation PLC, London, United Kingdom

[21] Appl. No.: 08/876,271

[22] Filed: Jun. 16, 1997

[51] Int. Cl.[7] .............................. G06K 9/62; G06K 9/72; G06K 9/74

[52] U.S. Cl. .................... 382/225; 382/224; 382/228; 382/229; 382/230; 345/440

[58] Field of Search .................. 382/224, 225, 382/226, 228, 229, 230; 345/440

[56] References Cited

U.S. PATENT DOCUMENTS

| | | | |
|---|---|---|---|
| 4,754,489 | 6/1988 | Bokser | 382/230 |
| 4,876,731 | 10/1989 | Loris et al. | 382/229 |
| 5,062,143 | 10/1991 | Schmitt | 382/230 |
| 5,075,896 | 12/1991 | Wilcox | 382/228 |
| 5,151,950 | 9/1992 | Hullender | 382/229 |
| 5,625,767 | 4/1997 | Bartell et al. | 345/440 |
| 5,703,964 | 12/1997 | Menon et al. | 382/228 |
| 5,751,850 | 5/1998 | Rindtorff | 382/228 |
| 5,818,952 | 10/1998 | Takenouchi et al. | 382/229 |

OTHER PUBLICATIONS

"An Association Based Method for Automatic Indexing with a Controlled Vocabulary", Christian Plaunt and Barbara A. Norgard, Oct. 2, 1995.

"Inductive Text Classification for Medical Applications", Wendy Lehnert, Stephen Soderland, David Aronow, Fangfang Feng, Avionoam Shmueli, *Journal for Experimental and Theoretical Artificial Intelligence*, 1995.

"Automated Classification of Encounter Notes in a Computer Based Medical Record", D.B. Aronow, S. Soderland, J.M. Ponte, Feng F., W.B. Croft, W.G. Lehnert, Undated.

"Suggesting Terms for Query Expansion in a Medical Information Retrieval System", Morris Hirsch, David Aronow, Undated.

"A Sequential Algorithm for Training Text Classifiers", David D. Lewis, William A. Gale, Jul. 24, 1994.

"Similarity between Words Computed by Spreading Activation on an English Dictionary", Hideki Kozima, Teiji Furugori, Undated.

"Training Algorithms for Linear Text Classifiers", David D. Lewis, Robert E. Schapire, James P. Callan, Ron Papka, Undated.

"Information Extraction as a Basis for High–Precision Text Classification", Ellen Riloff, Wendy Lehnert, *ACM Transactions on Information Systems*, vol. 12, No. 3, pp. 296–333, Jul. 1994.

"Combining Classifiers in Text Categorization", Leah S. Larkey, W. Bruce Croft, Mar. 20, 1996.

(List continued on next page.)

*Primary Examiner*—Leo H. Boudreau
*Assistant Examiner*—Daniel G. Mariam
*Attorney, Agent, or Firm*—Gray Cary Ware & Freidenrich LLP

[57] ABSTRACT

Documents are classified into one or more clusters corresponding to predefined classification categories by building a knowledge base comprising matrices of vectors which indicate the significance of terms within a corpus of text formed by the documents and classified in the knowledge base to each cluster. The significance of terms is determined assuming a standard normal probability distribution, and terms are determined to be significant to a cluster if their probability of occurrence being due to chance is low. For each cluster, statistical signatures comprising sums of weighted products and intersections of cluster terms to corpus terms are generated and used as discriminators for classifying documents. The knowledge base is built using prefix and suffix lexical rules which are context-sensitive and applied selectively to improve the accuracy and precision of classification.

11 Claims, 8 Drawing Sheets

OTHER PUBLICATIONS

"Viewing Morphology as an Inference Process", Robert Krovetz, Undated.

"Corpus–Specific Stemming using Word Form Co–occurrence", W. Bruce Croft, Jinxi Xu, Undated.

"Automatic Assignment of ICD9 Codes to Discharge Summaries", Leah S. Larkey, W. Bruce Croft, Undated.

"Similarity–Based Estimation of Word Cooccurrence Probabilities", Ido Dagan, Fernando Pereira, Mar. 27, 1996.

"Context–Sensitive Measurement of Word Distance by Adaptive Scaling of a Semantic Space", Hideki Kozima, Akira Ito, Undated.

"Structural Tags, Annealing and Automatic Word Classification", J. McMahon, F.J. Smith, Oct. 25, 1994.

Schütze, et al "A Cooccurrence–Based Thesaurus and Two Applications to Information Retrieval," pp. 307–318, Feb. 1996.

| | $p_1$ | $p_2$ | $p_3$ | $p_4$ | $p_5$ | | | | $p_i$ | | $p_n$ |
|---|---|---|---|---|---|---|---|---|---|---|---|
| $\vec{P}$ | $C_1$ | 0 | $C_3$ | $C_4$ | 0 | | | | $C_i$ | | 0 |
| $\vec{C_{P_i}}$ | $Z_1$ | $Z_2$ | 0 | $Z_4$ | $Z_5$ | | | | $Z_i$ | 0 | $Z_n$ |
| $S_{PC_i}$: | $S_1$ | 0 | 0 | $S_4$ | 0 | | | | $S_i$ | 0 | 0 |

TEST CLASSIFICATION SYSTEM AND METHOD

BACKGROUND OF THE INVENTION

This invention relates generally to machine processing of text, and more particularly to text classification systems and methods for the analysis and management of text. As used herein, text classification refers to the automated grouping of textual or partial textual entities for document retrieval, categorization, routing, filtering, and clustering, as well as text processing tasks such as tagging, disambiguation, and domain specific information extraction processing.

Traditional approaches to automated information retrieval have typically used key words and statistical techniques to locate and retrieve relevant documents. Statistical techniques have the advantage of being easily automated, but require a large collection of text to process and, in general, have not demonstrated a high degree of accuracy and precision. In addition, indexing and classification of documents must be done largely by humans for each text entity in the collection. Linguistic approaches also have several limitations. Different words and phrases can be used to express the same concept, and differences in vocabulary can pose significant problems in text processing. For example, synonyms for the term cancer include neoplasm, tumor, malignancy, carcinoma, and sarcoma. Key word searches that do not include synonyms for terms could miss relevant documents. This is particularly true in certain areas such as medicine, engineering, and other fields where different words and phrases can express the same concept. One approach to handling this problem is to use a dictionary that is specific for a particular subject area. Typically, the dictionary must be created manually. This is a time consuming task, and if inaccurate or incomplete can still miss many relevant documents. Another problem is that words may have multiple meanings, even in the same text. The word nail, for example, can refer to a metal fastener or to the nail on a person's finger or toe which the hammer may strike of it misses the "nail." Similarly, the word post may be a noun referring to a vertical support, as for a fence, or to a newspaper, and may be a verb referring to entering transactions into a ledger or sending a message. Since the meanings of words and phrases can vary depending upon context, lexical ambiguity limits the accuracy with which traditional automated approaches can process text.

Text classification systems enable documents to be indexed and classified by subject or area of interest and are helpful in improving the ability to retrieve information. A number of classification systems have been developed for this purpose. These include, for example, the Standard Industry Classification (SIC) and the Medical Subject Headings (MeSH) systems. The MeSH system is a hierarchical system of headings or classifications which are assigned to documents based upon context. There are approximately 100 top level MeSH categories, and approximately 32,000 nodes or clusters in the hierarchical classification tree. One or more MeSH classification codes are assigned to documents in the medical field depending upon subject and context. The classification codes often overlap, however, and the association between codes may derive from different, unrelated, or obscure contexts. It is difficult for a human being to keep all of the various classifications in mind, which makes classification tasks a complex and time consuming operation requiring a high level of expertise. Therefore, it is highly desirable to have an automated system for performing this task.

Several statistical approaches to classification have been used. One approach known as the vector space model determines the occurrence of each word in a group of documents comprising n words, and constructs a vector having n elements with values representing the weight of each word. Weight may be determined, for example, as the log (1+1/f) where f represents the frequency of occurrence. Higher frequencies result in lower weights. The relationship of a document to a cluster (classification category) is determined by the cosine of the angle between a vector which characterizes the document and a vector which characterizes the cluster. If the cosine value is high, the document belongs to the cluster.

Another approach represents each document of a plurality of documents as a vector in n-dimensional space, and determines a point corresponding to the centroid of the space. The distance between a document to be classified and the centroid is then measured, and a weighting algorithm is employed to determine the relationship of the document to the cluster. According to another similar approach, instead of measuring the distances between a centroid and a document, a cloud or cluster of points in space is constructed which represent a cluster of related documents. A new document is classified in a particular cluster if its point in space is within the cloud for that cluster. Additional approaches include using decision trees, linear classifiers, and probabilistic methods.

The problem with such known techniques is that they do not work very well because the vectors are "noisy", i.e., contain many non-relevant words to a particular classification or cluster. Decisions based on the number of occurrences of words do not account for the fact that noise produces random fluctuations in word frequency. Furthermore, many such documents contain a large number of words which are common to different clusters and may have little relevance to a particular classification. For example, words such as hospital, patient, surgery, etc. may appear commonly in documents related to medicine which are classified in a large medical database, but such common words (to the medical field) would not be particularly relevant or helpful in classifying a document in a particular area such as breast neoplasm. To cope with this problem, some approaches have attempted to give common words a lower weight. This has not been successful primarily because weights have been assigned across a whole collection in advance of knowing the significance to a subcollection of documents.

As a result of problems such as the foregoing, known automated text classification systems and methods have suffered from lack of accuracy and precision. It is desirable to provide machine-implemented text processing systems and methods which overcome such problems of accuracy and precision and which provide an efficient, inexpensive, and rapid text classification system and method which rivals human experts. It is to these ends that the present invention is directed.

SUMMARY OF THE INVENTION

The invention affords an automated system and method for processing and classifying text entries which offers significant improvements in precision and accuracy over many known systems and methods. The invention, for example, has achieved improvements in accuracy of 20% or more over conventional text processing systems and methods. Such dramatic improvement is due in significant respect to the fact that the invention is context sensitive, and measures the semantic closeness or similarity between terms such as words and phrases by comparing the contexts in which terms are significant. It has been found that statistical similarity in the distribution of words among contexts closely matches their semantic relationship. Moreover, there is a straight-forward association with morphology. Word inflections have been found to be distributed statistically in a manner similar to their roots in most cases. When they were not, there was a significant difference in meaning. The invention distinguishes, for example, between aid and aids, whereas the usual inflectional rules used in conventional approaches that equate singulars and plurals and verb form person would not distinguish between these terms. The invention does so by generating suffix and prefix inflection rules, for example, for all possible inflections of a word with its semantic neighbors, and choosing as applicable those rules that repeat consistently. This enables inflection to be accurately identified and handled as one term, substantially reducing processing and improving the ability to classify between documents on the basis of context. The invention affords a machine automated process which can learn linguistic rules and apply them selectively depending upon context.

The invention enables a large corpus of text such as a collection of documents related, for example, to medicine to be analyzed and classified into a large number of predefined classifications and the constructing of a knowledge base that includes for each classification or cluster matrices of significant words and phrases and their statistical signatures. The knowledge base can be used for a number of different applications. These include, for example, classification of new documents or textual entities into appropriate clusters depending upon their significance, identification of key terms in a document in order to facilitate a search for other similar documents, and identification of relevant phrases and terms in a cluster to facilitate search and retrieval of text that would be classified in that cluster.

More particularly, the invention provides a system and method for processing text in which a corpus comprising a collection of a large number of documents is processed to determine a normalized weight of significance of each term in each of a predefined number of clusters, and these significant values are used as entries into a n×m matrix corresponding n clusters and m terms. Statistically insignificant values are removed from the matrix and, for each cluster statistical signatures which characterize the cluster are determined from the weighted product of significant terms in the documents of the cluster and from intersection of significant terms. For each word in the matrix, a list of champions is constructed comprising words which are related or used in the most similar way. The list of champions are used to generate lexical rules and word inflections lists are constructed which are significant in characterizing the terms in the matrix. Lists of inflections are generated by selectively applying the semantic lexical rules to words and using the list of champions. Word and phrase dictionaries comprising the original corpus of text are constructed, and identifiers replace each set of inflections. Next, the process is repeated for significant phrases in the text. The resulting matrices of words and phrases, the word and phrase dictionaries constructed by the process, and the statistical signatures of each cluster comprise a knowledge base. The knowledge base can be used in other applications such as to classify new documents, to identify key terms or relevant phrases, and to assist in information retrieval, routing, filtering or in other text processing tasks.

In one aspect, the invention provides a system and method of classifying a text entity into one or more clusters of a predetermined set of clusters which characterize text entities into related subject areas. For a selected term in the text entity, and for a selected one of the clusters, the number of occurrences of the selected term in the cluster is determined. Using the number of occurrences, the statistical characteristics of the distribution of the term in that cluster and the statistical significance of the term in that distribution are determined. A confidence interval of significance values corresponding to a predetermined probability of occurrence of the selected term in the cluster due to chance is established. Terms in a text entity to be classified are rejected as insignificant to the cluster if they have statistical significant values that fall within the confidence interval. Terms which have significant values that fall outside of the confidence interval are selected as significant. A vector of significant terms for the text entity is constructed for each of the clusters, and the text entity is classified into those clusters in which the entity has a number of significant terms greater than a predetermined threshold number.

In another aspect, the invention provides a method and system of classifying text entities in a corpus of text into a plurality of clusters which characterize the text entity according to related subject areas. The invention includes determining the semantic similarities between pairs of words in the text corpus which are significant to classification of text entities into each cluster. For each word, an association list of other words which are semantically related closely to the selected word is generated. Candidate suffix and prefix lexical rules are generated for each word by matching character strings in portions of each word to corresponding strings in portions of words that are in the association list for that word, and by equating the nonmatching character strings in the selected words and the association list. Candidate lexical rules are rank ordered, and those occurring greater than a predetermined threshold number of times are selected as lexical rules for classification of text.

In a more specific aspect, for each word in the corpus, a lexical rule is applied to generate a candidate inflection of the word. The candidate is compared to the association list for the selected word to identify words in the list which match the candidate inflection, and candidates which match words in the association list are selected as valid.

In yet another aspect, the invention provides a system and method for classifying text entities into predefined clusters which comprises generating for each cluster statistical signatures comprising discrimination functions which determine cluster membership. The discrimination functions include weighted product and intersection measurements which characterize the significance of a term to a cluster and the number of significant terms in common between a cluster and a text entity. To classify a text entity, phrases and free words in the text entity are determined, and the weighted product and intersection of the phrases and words with significant phrases and words for each cluster are determined. A score which represents the relevance of each cluster to the text entity is generated. The scores are rank ordered, and the text entity is classified in a predetermined number of clusters having the highest scores.

DETAILED DESCRIPTION OF PREFERRED EMBODIMENTS

The invention is particularly applicable to the classification of text in a large specialized database having predefined classifications, such as a database of medical documents classified into a plurality of clusters or classifications using the National Library of Medicine MeSH headings, and will be described in that context. It will be appreciated, however, that this is illustrative of only one utility of the invention.

Figure 1:
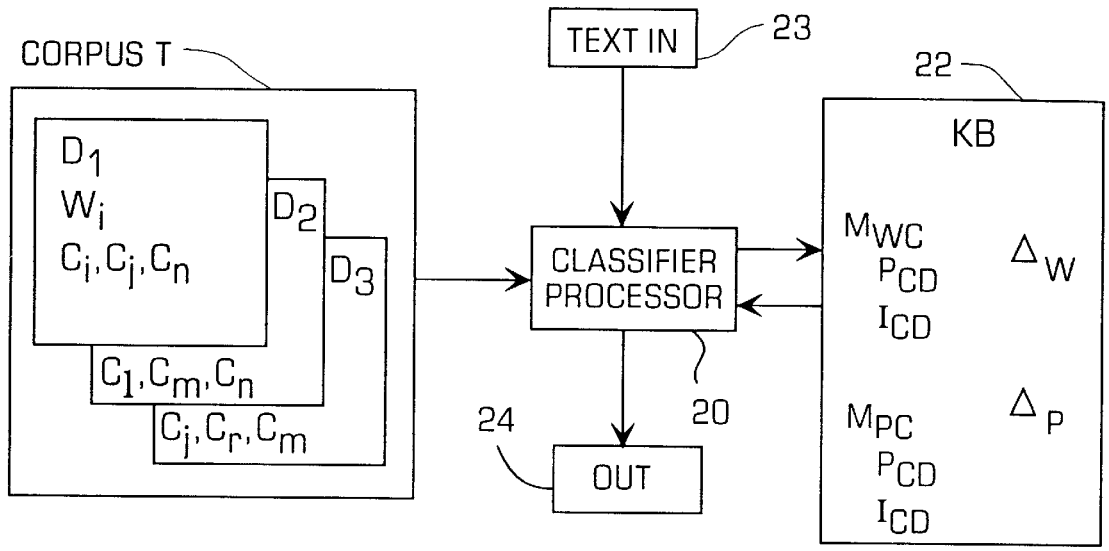
FIG. 1 is a block diagram of a system for classifying text in accordance with the invention.

FIG. 1 illustrates a system in accordance with the invention. As shown, the system comprises a classifier processor 20 including a computer system which interfaces with a knowledge base (KB) 22 that may be stored in a memory interfaced to the classifier. The classifier may receive as an input text 23, which may comprise a document, a part of a document, key words or phrases, or other textual entity for processing by classifier 20. The output 24 the classifier may be the result of the processing, and may include the classification of the input text, key words or phrases, or information retrieved from the knowledge base corresponding to a search request, etc. The classifier may also be used for constructing the knowledge base initially from a corpus T comprising a plurality of documents D or for supplementing an existing knowledge base. Each document contains a plurality of terms comprising words, $w_i$, and phrases, $p_i$, and is classified into one or more clusters or classifications $C_j$ of a predefined set of classifications. Each cluster C comprises a subcollection of documents within the corpus which are related by context or subject matter. A list of all the significant words and phrases within the collection of documents is contained in word and phrase dictionaries $\Delta_w$ and $\Delta_p$ in the knowledge base. As noted, the corpus T may be a collection of documents in the medical field, and the clusters may comprise a hierarchical structure of approximately 32,000 MeSH headings or classification codes defined by the National Library of Medicine. The MeSH headings classify each document according to one or more contexts or subjects related to medicine, and to subcontexts or specific aspects of that particular subject. For example, a MeSH heading for <breast disease> has a plurality of subcategories, one of which is <breast neoplasm>. And below <breast neoplasm> in the hierarchy, there are other pluralities of subheadings related to more specific aspects of breast cancer. In this way, the classification system permits documents relevant to specific aspects of a particular area of interest to be quickly identified and retrieved.

The classifier 20 of FIG. 1 operates on the corpus T of documents to build or supplement the knowledge base 22 by automatically analyzing and classifying each document into one or more appropriate clusters to which the subject matter of the document relates. Thereafter, new documents may be appropriately classified automatically into clusters by the system; documents matching search requests may be retrieved; documents may be automatically routed or filtered depending upon input requests; and documents may be otherwise tagged or processed to extract domain specific information.

As will become apparent from the following description, the invention may be employed with any collection of text documents that are classified or intended to be classified into predefined classification categories, whether hierarchical or not. In addition to finding application in classifying documents in specialized subject areas or databases, such as medicine, engineering, law, etc., the system may also be employed for classifying more general subject matter databases in accordance with a predefined classification structure. The invention is also useful for correlating databases on the same subject which may use different headings or different classification codes. For example, while the National Library of Medicine Medline database employs MeSH headings as described to classify medical documents, the BIOSIS® and EMBASE® medical databases also classify medical documents using their own specific classification codes. The invention can be used for information classification retrieval and text processing from among all three databases, for example, and is particularly useful for key term extraction and relevant term identification, which will be described later.

As indicated in FIG. 1 and as will be described in more detail shortly, knowledge base 22 also comprises a word matrix $M_{W,C}$ which comprises an array of word vectors for each cluster. The element values of each vector indicate the significance of the word in the cluster. The knowledge base also comprises a phrase matrix $M_{P,C}$ comprising an array of phrase vectors which indicate the significance of each phrase to a cluster. In addition, the knowledge base also includes statistical signatures for each cluster comprising weighted products $P_{C,D}$ of significant terms and the intersection $I_{C,D}$ of significant terms in each cluster. These statistical signatures characterize each cluster and are important for applications as will be described later. Finally, the knowledge base also includes a word dictionary, $\Delta_w$ of relevant words and a phrase dictionary $\Delta_p$ of relevant phrases in the documents in corpus T.

The invention will now be described for building a knowledge base. The process will first be described generally, and then the details of the various portions will be described.

Figure 2:
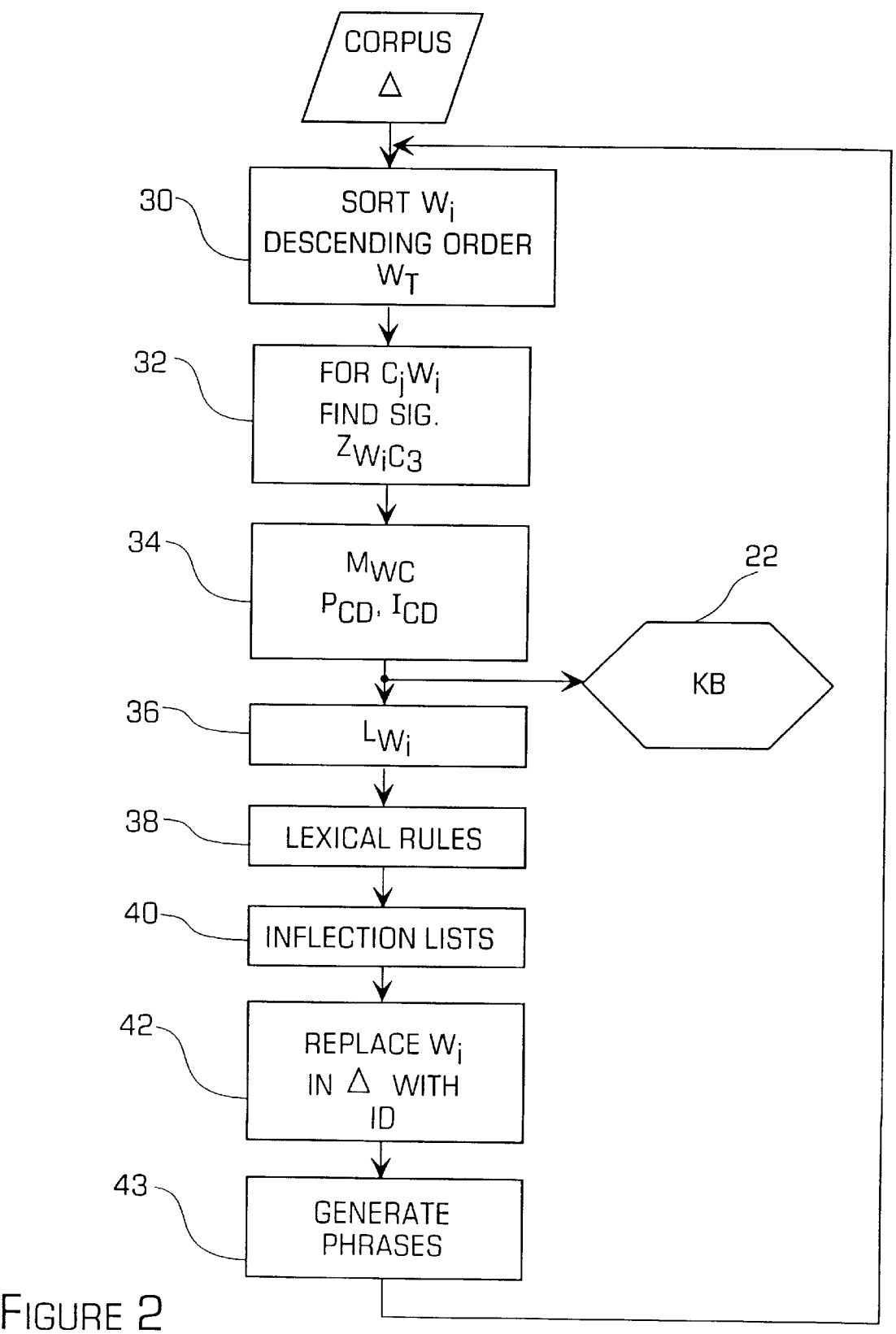
FIG. 2 is a flow diagram illustrating a process in accordance with the invention for building a knowledge base.

Referring to FIG. 2, the process of building the knowledge base involves constructing a pair of large arrays or matrices $M_{W,C}$, which is an array of vectors of statistically significant words for each cluster, and $M_{P,C}$, which is an array of vectors of statistically significant phrases for each cluster. In addition, the knowledge base also comprises the cluster statistical characteristics or signatures for each cluster. These matrices and statistical signatures may then be used for classification of documents or for other applications as will be described later.

The process of building the knowledge base begins with building from the corpus a dictionary $\Delta$ of words in the corpus and sorting the words in descending order of occurrence, as indicated in step 30. Next, for each cluster $C_j$ and each word $w_i$ in the text, the significance $Z_{WiCj}$ is determined for the cluster (step 32). Vectors of statistically significant words together form the word matrix $M_{W,C}$ (step 34) and the statistical signatures of the cluster comprising the sum of weighted products $P_{C,D}$ and the intersection $I_{C,D}$ are determined as will be described. The matrix and statistical signatures are placed in the knowledge base 22.

Figure 3A:
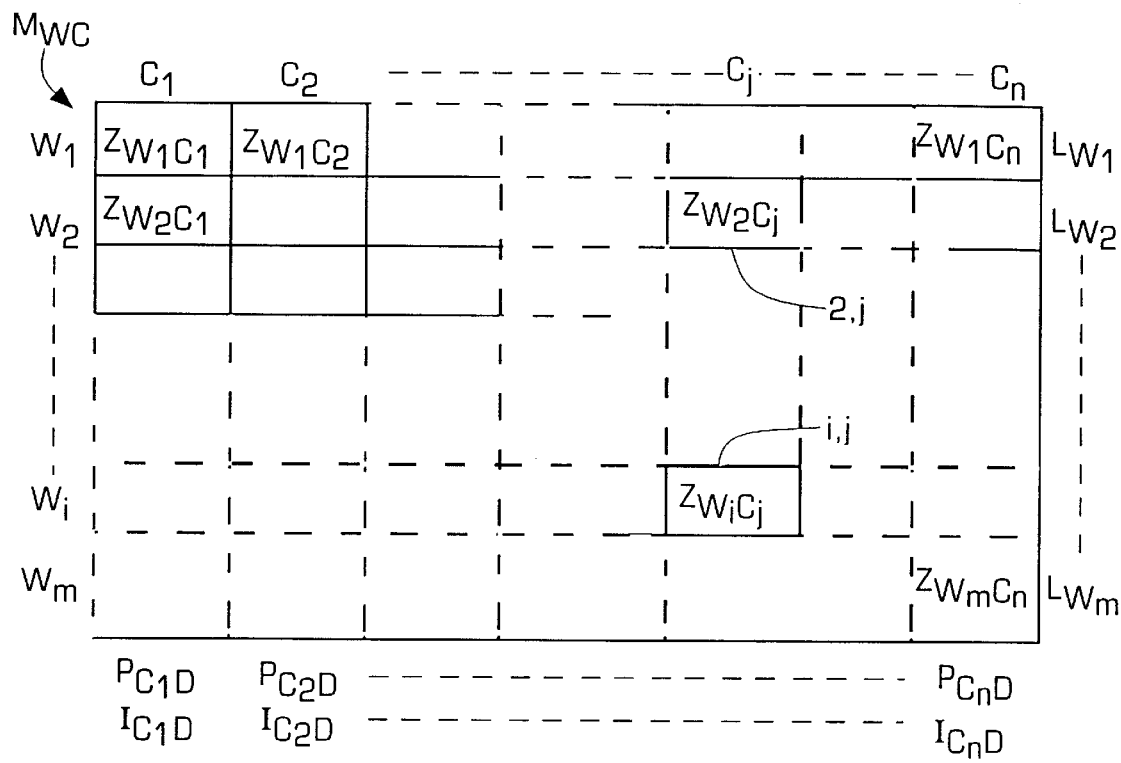
FIGS. 3A and 3B illustrate, respectively, matrices of words and phrases which are significant to a predetermined set of clusters.

FIG. 3A is a representation of the matrix $M_{WC}$ showing each cluster vector $C_j$ as a column of the matrix having an entry for each word $w_i$ representing the statistical weight of significance of the word $w_i$ in that cluster $C_j$. For words which are not statistically significant to a cluster, the corresponding $Z_{W,C}$ are set to zero. For example, in FIG. 3A, the weights $ZW_2Cj$ and $ZWiCj$ of the elements at rows 2 and i in the column vector $C_j$ are set to zero, indicating that the weights of the words $w_2$ and $w_i$ are statistically insignificant in cluster $C_j$. The manner in which this is determined will be described in more detail shortly.

Figure 3B:
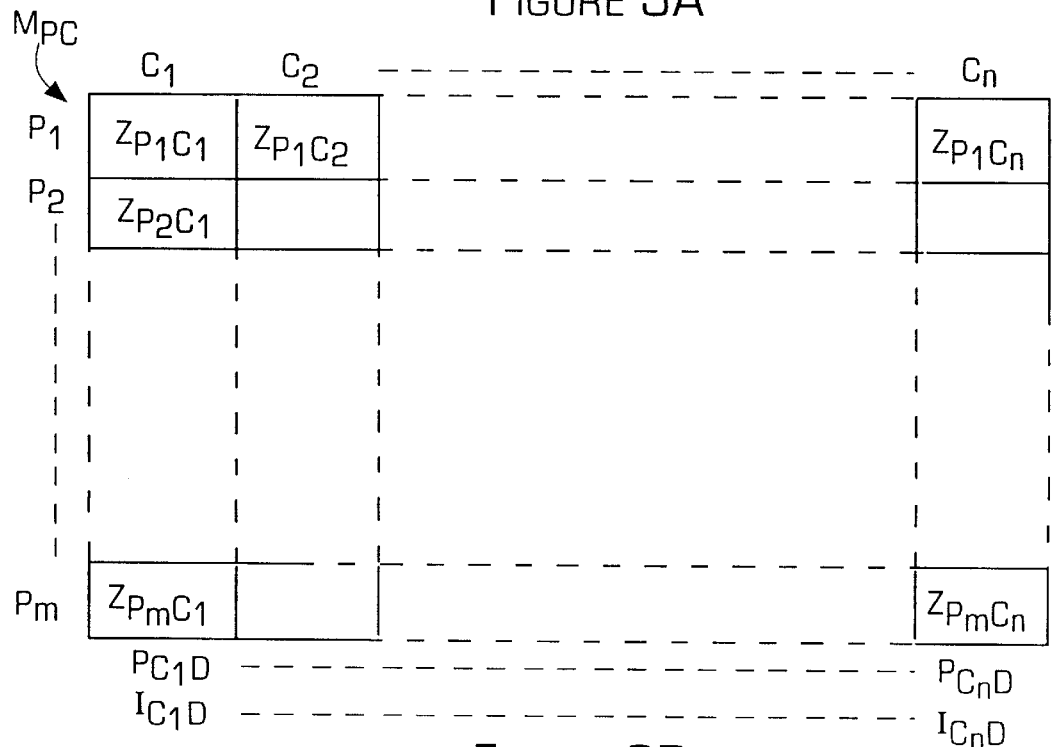

After construction of the word matrix $M_{WC}$ and the corresponding statistical signatures of each cluster of the matrix, the process determines for each word of the matrix a list of champions $L_W$ in step 36. This is a list of words that are most closely associated with a word, determined as will be described later. Using the list of champions, lexical rules are generated at 38, and the lexical rules are applied to every word in the corpus to generate a list of inflections for the word at step 40. Next, each word in the dictionary is replaced with an identifier (ID) for the inflection group to which it belongs at step 42. At step 43, the inflections are used to generate phrases and steps 30, 32 and 34 are repeated for phrases instead of words. The result of the application of these steps to phrases is to produce a phrase matrix $M_{PC}$ (see FIG. 3B) and associated cluster statistical characteristics $P_{C,D}$ and $I_{C,D}$ for each cluster. The phrase matrix has a structure similar to the word matrix in FIG. 3A, and it along with the cluster statistical signatures for phrases are placed in the knowledge base 22.

An important aspect of the invention is the manner in which the matrices of significant words and phrases and associated cluster statistical signatures are developed and used to classify documents with clusters. The invention classifies a document into a cluster based upon an evaluation of the individual relevance of the document to that cluster, rather than to a group of clusters. Documents may be classified in several clusters to which they may be relevant. In contrast to conventional classification techniques which assign the same weight to a word in different documents, and then assign documents to clusters based upon the weights, the invention looks at words that are significant using a context-specific approach, and establishes not only a relationship between a word and a cluster, but also the significance and the relevance of that word to a cluster. The invention obtains lists of significant words in a document to each cluster, and a corresponding weight. It considers multiple clusters which is necessary because of the fine gradations between clusters as, for example, in the MeSH classification system. Noisy words, which are a principal source of mistakes in conventional classification methods for classifying documents, are not effectively dealt with in conventional approaches and removal of such words is a key feature of the invention. For example, the terms surgery, hospital, patient or results, etc. are not particularly relevant in identifying documents which are significant to the cluster <breast neoplasm>. Removal of noisy words is done by measuring the statistical significance (rather than the frequency of occurrence) of the word in a given context. If the distribution of the word in a cluster is the same as it is outside of the cluster, it is not helpful or significant in classifying the document. Even though a word may have a low weight on a general scale, but high frequency, it produces noise and can result in classification errors.

The removal of insignificant words in a cluster is an important feature of the invention, for otherwise the determination of whether a document belongs to a particular cluster is cluttered with noise introduced by occurrence fluctuations of the insignificant words. Removal of insignificant words depends upon determining the significance of words in a cluster. Prior to describing the details of the process, it will be useful to introduce some definitions which will be used in the description. These are:

T—corpus, a set of all the documents or text at hand.

Δ—corpus dictionary. A list of words/phrases (hereafter, word and term will mean either words or phrases)

D—a document.

$\vec{D}$—a document vector $(w_1, w_2, w_3, \ldots w_n)$, here $w_i$ is the number of occurrences of the i-th word in the dictionary that occur in D.

C—a cluster, a set of documents which are classified together. The terms cluster/subcollection/category may be used interchangeably. They all mean a subcollection of documents within the corpus.

$\vec{C}$—a cluster vector, $$\vec{C} = \sum_{D \in T} \vec{D}$$

$\vec{T}$—a corpus vector, $$\vec{T} = \sum_{D \in T} \vec{D}$$

For every vector $\vec{V}$, its size is a sum its terms:

$$|\vec{V}| = \sum_{i=1,n} w_i.$$

To simplify the discussion the notion $|\vec{V}|$ will be equivalent to $|V|$.

In order to find significant words in a cluster, it is necessary to determine whether differences in frequency of occurrence of the word inside and outside of the cluster are attributable to chance. For any single word, $w_i$, with a total number of its occurrences in the corpus equal to $W_T$, and the total number of its occurrences in a cluster equal to $W_C$, if a word were randomly distributed between a cluster and its complement, the number of words in the cluster would be a random variable following the hypergeometric distribution:

$$p(x = W_C) = \frac{\binom{W_T}{x}\binom{|T|-W_T}{|C|-x}}{\binom{|T|}{|C|}}, \quad (1)$$

where the notation $$\binom{n}{m} = \frac{n!}{m!(n-m)!} \quad (2)$$

Here, |T| is the total number of words in the corpus T, and |C| is the total number of words in the cluster C. A confidence interval $[X_{low}, X_{high}]$ can be chosen at a high probability level, for example, 0.99. When the number of occurrences $W_C$ fall within that interval, $W_C$ is determined to be a random occurrence. Whenever the number of occurrences $W_C$ does not fall within that interval, the word is determined to be significant to the cluster since that number of occurrences of the word cannot be attributable to chance. Stated differently, in this latter situation there is a high probability that the word is significant. Working directly with the hypergeometric distribution of equation (1) is difficult, and is desirable to employ an approximation. When the expectation value $$|C|\frac{W_T}{|T|}$$

exceeds 5, a normal probability distribution can be employed to approximate the hypergeometric distribution. The expectation value $\mu$ and deviation $\sigma$ are:

$$\mu = |C|\frac{W_T}{|T|} - 0.5, \text{ and} \quad (3)$$

$$\sigma = \sqrt{|C|\frac{W_T}{|T|}\left(1 - \frac{W_T}{|T|}\right)\frac{|T|-|C|}{|T|-1}} \quad (4)$$

Here, $$\frac{W_T}{|T|}$$

is the word frequency of $w_i$ in the corpus, and $\mu$ is the number of occurrences the word should have in the cluster provided it was distributed randomly. Clearly, the more a word deviates from its expected occurrence value, the more significant the word is.

Changing variables, $W_C$ can be related to standard normal variable Z (i.e., the normal deviate):

$$Z_{Wc} = \frac{Wc - \mu}{\sigma} \quad (5)$$

Figure 4:
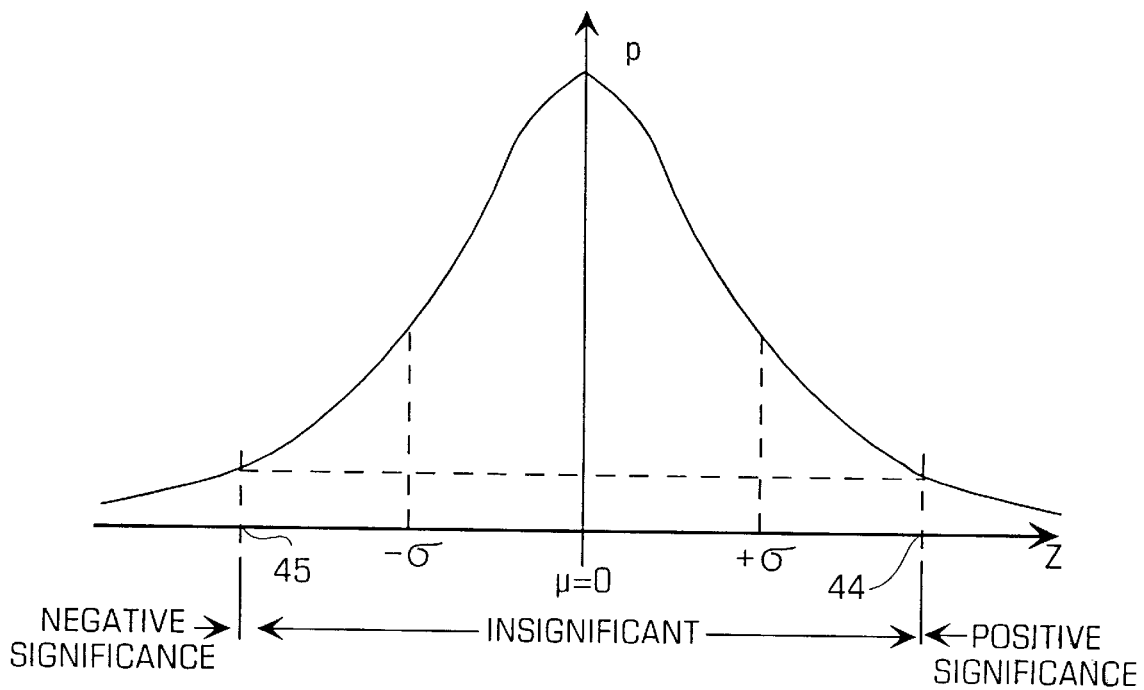
FIG. 4 is a diagram illustrating a standard normal probability distribution curve.

The standard normal distribution curve is shown in FIG. 4. Words with expected occurrence $$|C|\frac{W_T}{|T|}$$

in the cluster exceeding 5 are selected for testing. Their corresponding $\mu$, $\sigma$, and Z weight are determined, they are sorted in decreasing order of Z, and those words with values of Z that indicate their occurrence as highly improbable in respect to a standard normal distribution are chosen.

This technique of determining that words are significant to a cluster if they have a probability which falls outside of the interval defined by the points 44–45 of FIG. 4 is very effective for discriminating between significant and non-significant words. As shown in the figure, words which have a value Z greater than the value indicated at 44 have positive significance, while those having a value less than that indicated by 45 have negative significance. Furthermore, the significance of a word W in a cluster C is given by equation (5). As will be described shortly, the values of points 44 and 45 in FIG. 4 are preferably selected to be +5 and −5, respectively. Thus, any word having a positive significance $Z_{WC} > 5$ is a word which is included in a list of significant words for cluster C, assigned the weight $Z_{WC}$, and inserted into the word matrix of FIG. 3A with $Z_{WC}$ as its weight of significance in that cluster.

The significant terms selection described above will rule out infrequent words because they will not meet the criteria for approximation. However, it's desirable to incorporate infrequent words because they are likely to include specific and informative cluster terminology.

As previously described, for the normal approximation to be valid for a term, the term frequency should meet the criteria:

$$\frac{|C|}{|T|}W_T > 5 \quad (6)$$

For small clusters and a large corpus many words will fail to meet this criteria, because |T| will be large and |C| will be small. This problem is addressed as described in connection with FIG. 5.

Figure 5:
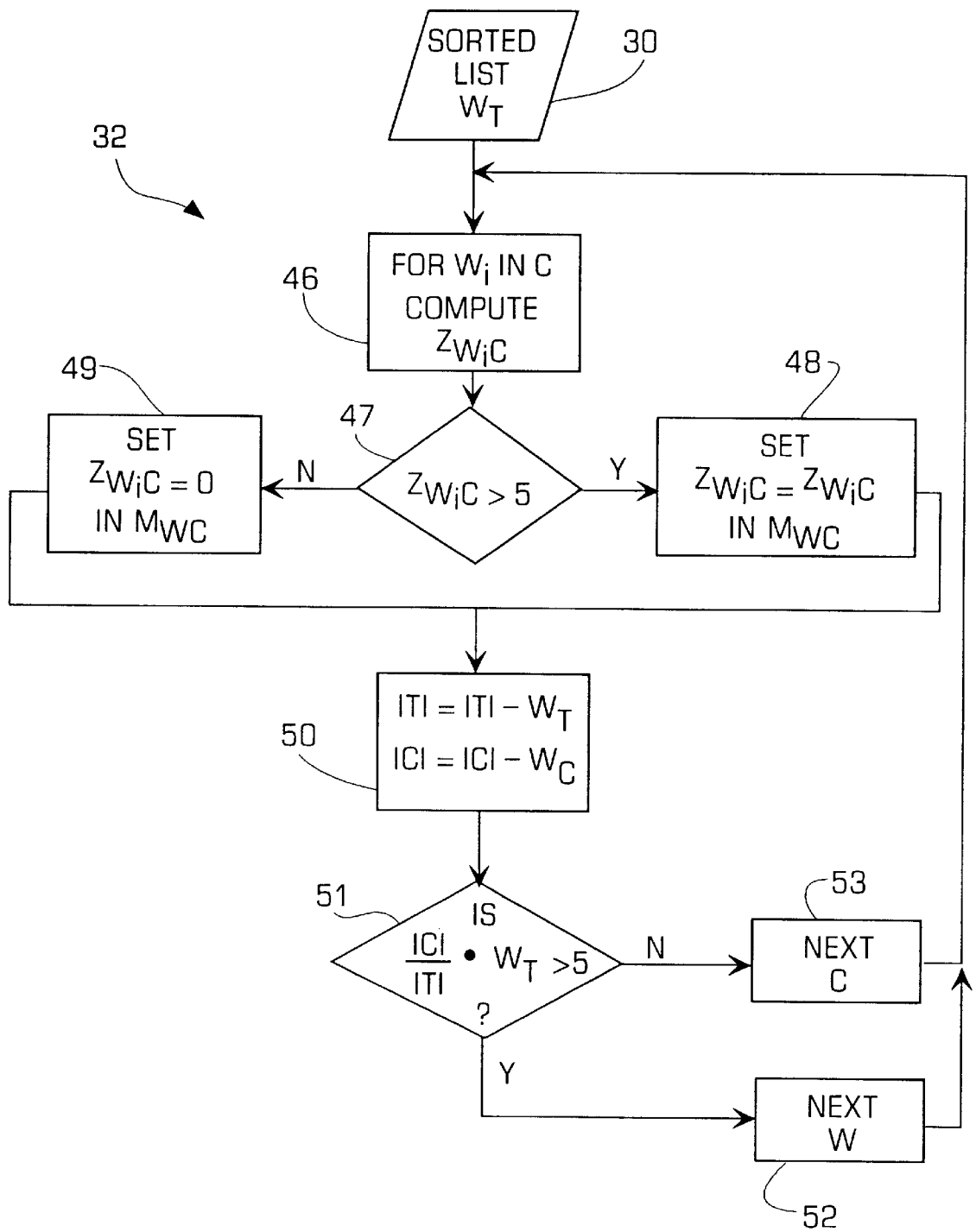
FIG. 5 is a flowchart which illustrates in more detail a portion of the process of FIG. 2 for determining the significance values of terms for the matrices of FIGS. 3A–B.

FIG. 5 illustrates the process for determining the weight of significance of each word to a cluster. It includes a method for adjusting the population against which equation (6) is applied to enable evaluation of many low frequency words which otherwise would not be considered because they would fail to meet the approximation necessary for the standard normal distribution to be used. FIG. 5 illustrates substantially the process 32 of FIG. 2.

Beginning at step 30, the sorted list of all words in the dictionary in descending order of occurrences $W_T$ are input into the process. At step 46, for a cluster C, the weight of significance $Z_{WiC}$ is computed for the first word in the cluster from the sorted list input at 30. In step 47, the value of the weight $Z_{WiC}$ is compared to a predetermined threshold value, e.g., 5, to determine whether the word is significant in cluster C. If the weight value is greater than the predetermined value of 5, the value is set at the calculated value of $Z_{WiC}$ as shown at 48 in the corresponding cluster vector in the word matrix $M_{WC}$. If the value is less than the predetermined threshold value, the corresponding entry in the cluster vector for that word is set to zero in the word matrix at 49.

Referring to FIG. 4, establishing positive threshold value, such as 5, is equivalent to taking the value of Z as being significant if it exceeds the value 44 on the standard normal curve, i.e., has positive significance, and setting the value to zero in the cluster vector otherwise. This eliminates insignificant values which are in the interval between 44 and 45 about the expected value, as well as those values of Z which are less than the value at 45 and have negative significance. In an alternative approach, greater precision and accuracy can be achieved by also accepting words with values which have negative significance since they have the same low probabilities of being random as do words having values of positive significance. To accomplish this, the process in step 47 of FIG. 5 can be changed to be $-5 > Z_{WC} > 5$. This then effectively eliminates only the values which are insignificant in the interval between 44 and 45.

Next, in order to extend the validity of the approximation of the hypergeometric distribution by a normal distribution to words of less frequency, in step 50 the number of occurrences of the word in the corpus ($W_T$) is subtracted from the total number of words in the corpus $|T|$, and the number of occurrences of the word in the cluster, $W_C$, is subtracted from the total number of words in the cluster $|C|$ before testing the next word for compliance. The rationale behind this is that the size of T goes down much faster than the size of C as frequent words are removed. This causes the ratio $|C|/|T|$ in equation (6) to increase (in step 51), validating the approximation for lower frequency terms. As long as the approximation holds, the next word in the cluster may be selected at 52 and the process is repeated. When the condition for approximation in step 51 fails, or the last word in the cluster is reached, the next cluster is selected at 53 and the process 32 repeats for each word in that cluster. The result of the process 32 of FIG. 5 is to create the word matrix $M_{WC}$ of FIG. 3A.

Next, the statistical characteristics or signature of each cluster is calculated. These may be used as discriminators to determine cluster membership. The invention accomplishes this using as discrimination functions a weighted product and an intersection. The weighted product is:

$$P_{C,D} = P(\vec{C}, \vec{D}) = \Sigma W_D Z_{WC}. \quad (7)$$

Here $W_D$ is the number of occurrences of a term W in the document D, provided D belongs to cluster C, and $Z_{WC}$ is the weight of the same term W in the cluster C. If $Z_W$ is not significant in C, $Z_{WC}=0$. The intersection is:

$$I_{C,D} = I(\vec{C}, \vec{D}) = \sum \begin{pmatrix} W_D, Z_{WC} > 0 \\ 0, Z_{WC} \leq 0 \end{pmatrix} \quad (8)$$

$I_{C,D}$ shows how many cluster C significant terms are contained in the document D, provided D belongs to cluster C.

One test of whether a document belongs to a cluster is to compare the discrimination values for the document to a threshold value. If a discrimination value goes above the threshold, the document may belong to a cluster. Otherwise the document is rejected as not part of the cluster. The invention determines this threshold in a unique and meaningful way by checking for the number of positive terms in a document of a given size.

The intersection $I_{C,D}$, when computed for every document in the cluster, is itself a random variable. The invention determines the parameters of the distribution of this random variable and estimates the probability of a document being a member of the cluster by the number of words significant in the cluster. The process seeks to determine if the occurrence of cluster positive terms in D are attributable to chance or not. This is analogous to word drawing from the cluster with replacement, and assumes that the frequency of positive terms, $f_p$, is fixed in time and space. It follows the binomial distribution for the number of positive words of C found in the document of size D, provided D is from the cluster C.

Defining terms, $I_{C,D}$ is the random variable of the number of positive significant terms of cluster C in a document D of size $|D|$; $P_C$ is the frequency of occurrence of a positive term in the cluster C text; and $$f_P = \frac{|P_C|}{|C|}$$

is the frequency of positive terms within the text of the cluster. The probability of finding $D_P$ positive significant terms of cluster C in a document of size $|D|$ is given by:

$$P(x = D_P) = \binom{|D|}{D_P} f_P^{D_P} (1 - f_P)^{(|D| - D_P)} \quad (9)$$

This distribution may be approximated with a normal one as before. Here the parameters of this distribution are:

$$\mu_{I_{C,D}} = f_P |D| - 0.5 \quad (10)$$

$$\sigma_{I_{C,D}} = \sqrt{f_P |D|(1 - f_P)} \quad (11)$$

Replacing $D_P$ with its normal deviate equivalent gives:

$$Z_{I_{C,D}} = Z_{D_P} = \frac{D_P + 0.5 - (f_P |D|)}{\sqrt{f_P |D|(1 - f_P)}} \quad (12)$$

Given a document D and a cluster C, and $Z_{D_P}$ computed as in equation (12), to determine whether D is a member of C and to what degree, the following process is used.

First of all, if $Z_{D_P}$ is less than −5, D does not belong to the cluster, for there is zero chance of $Z_{D_P}$ having a value that low by chance. If $Z_{D_P}$ is about 0, D does belong to C since the number of C significant terms in D is about the expected value of zero. A low probability cut-off value can be selected (e.g., 3%) corresponding to Z=−2. If Z falls below −2, the probability that if D belongs to C this could have happened by chance falls below 3%.

Thus, a discrimination rule is used to decide if a document D is a member of a cluster C. To apply this rule, parameters $\mu_{I_{C,D}}$ and $\sigma_{I_{C,D}}$ for a given cluster are computed. These parameters are statistical characteristics or statistical signatures of a cluster. They estimate how many terms a document must have in common with the cluster in order for it to be considered a member of this cluster.

A similar approach may be applied to the $P_{C,D}$ discrimination function. When computed over all the documents in a cluster, $P_{C,D}$ also is a random variable which may be assumed to be distributed normally with parameters $\mu_{P_{C,D}}$ and $\sigma_{P_{C,D}}$. Again, to estimate the probability that a given document D belongs to a cluster C, the weighted product $P_{C,D}$ and the distributional parameters are determined. Given a positive term W of a cluster C, $f_{W,C}$ is the frequency of W in the cluster equal to:

$$f_{W,C} = \frac{|W_C|}{|C|} \quad (13)$$

In the binomial model, a document of size $|D|$ is analogous to a sequence of trials of length $|D|$. An outcome of a trial could be any positive term of C with respective probability $p_{W,C} = f_{W,C}$ or a term that is not in C with probability equal $(1−f_P)$. In this model, $P_{C,D}$ becomes a sum of independent outcomes of each trial. The weight of a single trial is a random variable S of the form:

$S = P_{W,C} \cdot Z_{W,C}$ with its distributional parameters $\mu_s$ and $\sigma_s$.

Computing directly from the cluster data:

$$\mu_S = \sum_{W \in C} P_{W,C} Z_{W,C} \quad (14)$$

and $$\sigma_S = \sqrt{VARs} = \sqrt{\sum_{W \in C} P_{W,C} Z_{W,C}^2 - \mu_s^2} \quad (15)$$

Since $P_{C,D}$ is a sum of $|D|$ independent random variables S with the same expectation and variance:

$$\mu_{P_{D,C}} = \mu_S |D| \quad (16)$$

and $$\sigma_{P_{D,C}} = \left(\sigma_S \sqrt{|D|}\right) \quad (17)$$

Thus for a given value of $P_{C,D}$ the invention computes its corresponding normal deviate Z and uses the same discrimination rule as described above for the intersection. Z may be computed from:

$$Z_{P_{C,D}} = \frac{P_{C,D} + 0.5 - \mu_{P_{D,C}}}{\sigma_{P_{C,D}}} \quad (18)$$

Statistical characteristics of the cluster become very important in the presence of multiple clusters to choose the best ones in which to classify a document. Statistical parameters give a very good indication if a document could in general belong to the cluster (e.g., has enough common words with the cluster, and has high enough product within the cluster).

Returning to FIG. 2, the next step 36 in the process is to determine a list of champions, $L_{Wi}$, for each word $_{WI}$ in the word matrix. Champions are terms that are most closely associated with a word. Importantly, it has been found that terms which are semantically close must be significant in similar clusters and have similar weights in these clusters. Likewise, terms that become significant in similar clusters and have similar weights must be close to each other semantically. Similarity of words is determined from the word matrix $M_{W,C}$ of FIG. 3A. As previously noted, the rows of the matrix represent all the terms in the dictionary, and the columns represent the clusters. The value in the matrix at each location, $Z_{WiCs}$, corresponds to the weight a term has in the associated cluster. Thus, each row of the matrix is a weighted vector of clusters in which a particular term is significant.

The measure of similarity S between two terms $W_m$ and $W_n$ is the normed product of cluster vectors (e.g., m-th and n-th rows of $M_{W,C}$).

$$S_{m,n} = \frac{\sum m_{mj} m_{nj}}{\sqrt{\sum m_{mj}^2 \cdot \sum m_{nj}^2}} \quad (19)$$

Since every weight in $M_{W,C}$ is a normal deviate of some distribution then all the weights across the whole matrix are "normalized" to a standard normal variable. This is an important fact that removes the need for further normalization.

Figure 6:
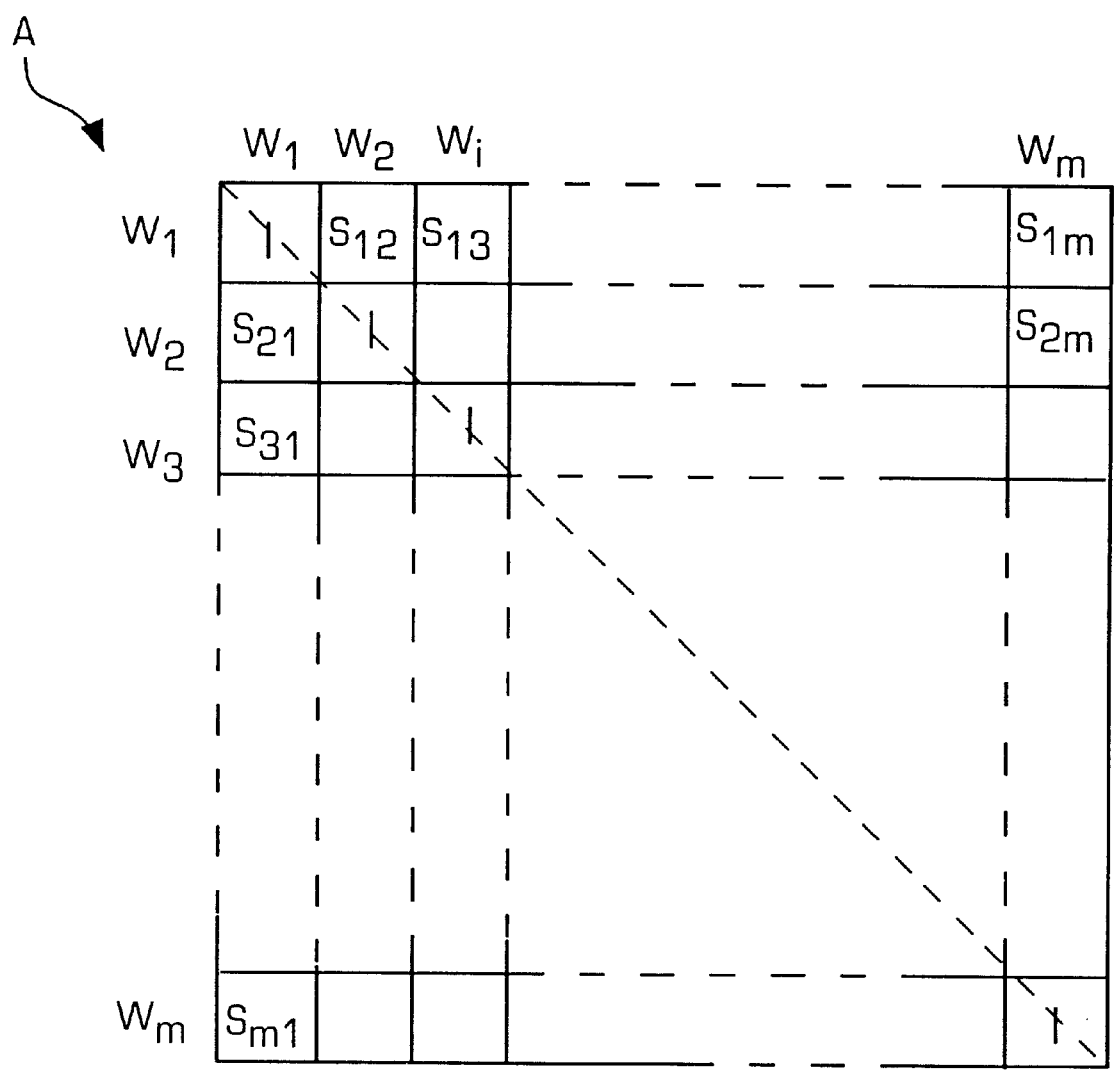
FIG. 6 illustrates an association matrix of similarity measures between words in a corpus of text.

Each of the words of the word matrix are pair-wise compared to generate similarity values. The similarity values comprise entries in an association matrix A which is shown in FIG. 6. The association matrix is a symmetrical square matrix with rows and columns corresponding to terms in the dictionary. Each element $a_{ij}$ is set to the similarity $S_{ij}$ between the i-th and j-th term. Given a term W, $L_W$ (a list of champions of W) is a list of terms that are most closely associated with W. The $L_W$ may be selected in two different ways; either, all the terms having similarity with W greater than a predefined threshold may be chosen, or all terms are sorted with respect to their similarity with W and the N—most similar ones are chosen. In the invention, the second approach is used to generate $L_W$ for every term in the dictionary.

The following Table 1 is an example of a list of champions generated for the word "hospital" in an actual run of the invention on a corpus of medical documents.

TABLE 1

| word | similarity weight |
|---|---|
| hospital | 1 |
| hospitals | 0.956479 |
| facility | 0.946504 |
| centers | 0.941124 |
| department | 0.93937 |
| visits | 0.933584 |
| unit | 0.932659 |
| care | 0.928586 |
| stay | 0.927459 |
| centre | 0.926459 |
| emergency | 0.921628 |
| wards | 0.917719 |
| outpatient | 0.917601 |
| admissions | 0.916944 |
| service | 0.916512 |
| affairs | 0.914212 |
| hospitalization | 0.913995 |
| center | 0.913341 |
| needed | 0.911208 |
| ward | 0.907625 |
| management | 0.905716 |
| services | 0.905168 |
| pharmacy | 0.904138 |
| improving | 0.903407 |
| manage | 0.903147 |
| managing | 0.902076 |
| multidisciplinary | 0.902046 |
| initiative | 0.902034 |
| centres | 0.901979 |
| discharge | 0.901619 |
| team | 0.901522 |
| plan | 0.90093 |
| provider | 0.900195 |
| teams | 0.899474 |
| stays | 0.899246 |
| outcomes | 0.899097 |

The similarity weights for the word hospital may then be entered into the association matrix A along with the similarity weights for all the other words in the word matrix. The association matrix may then be used in the generation of lexical rules which are applied to each word to produce a corresponding list of inflections (steps 38 and 40 of FIG. 2). Inflections are words which have the same or substantially the same meaning but different spelling, and that are derivable through lexical rules.

The English language has a number of common lexical rules, mostly suffix and prefix replacement rules in the form: "string" <-> "string", "ed" <-> "ing" or "s" <-> " ". The replacement rule "s" <-> " " means that the suffix "s" and the null set " " can be interchanged. This is equivalent to equating singulars and plurals. For the word, tested, for instance, applying the rule 'ed" <-> "ing" means replacing the suffix "ed" with the suffix "ing" to produce the word testing. The word testing may or may not be close in meaning to tested, but if it is, then testing and tested are called inflections of each other.

These lexical rules may be applied to a word to get another word with the same or nearly the same meaning. Words generated this way make a list of inflections, i.e., a list of words with the same meaning, as for example: test, tests, tested, testing, testability, as well as pretesting, biotest, posttesting, etc.

Many common lexical rules may be well known, but there are many lexical rules that exist only in a specific knowledge domain. For example, in medicine, there are many rules inherited from Latin and Greek languages, such as "ectomy" <-> "otomy". The application of this rule will generate the following inflection pairs:

TABLE 2

| Inflection Pairs | |
|---|---|
| keratectomy | keratotomy |
| laminectomy | laminotomy |
| trabeculectomy | trabeculotomy |
| craniectomy | craniotomy |
| stapedectomy | stapedotomy |
| capsulectomy | capsulotomy |
| iridectomy | iridotomy |

The words in this inflection pair list are highly specific to the field of medicine, and have a strong Latin origin. Therefore, it is unlikely that even a trained linguist could come up with this or similar such knowledge-domain-specific rules. The invention, however, provides a method for generating lexical rules which are correct for a specific knowledge domain of interest.

Unlike conventional text processing systems which attempt to apply a predefined set of rules to text to determine inflections, the invention generates lexical rules which are specific to the particular knowledge domain and which are also context sensitive. For example, the common English language lexical rule which equates singulars and plurals by equating the suffix "s" with the null set " ", if automatically applied to text without any consideration of context would produce an incorrect inflection pair in the case, for example, of aid—aids. The invention avoids this by generating context specific lexical rules for each word in the dictionary by insuring that a rule is determined as valid only if it produces a result that is in the corresponding list of champions for that word. Rules are first generated for suffixes and then for prefixes. The process is as follows.

In order to generate suffix rules, for every word W in the dictionary, the process goes through the corresponding list of champions $L_W$ for that word, and applies a cut algorithm to the first part of the word; the process then seeks to identify sequences of characters in the first part of the word which match sequences of characters in the list of champions. When matches are discovered, a rule is generated in which the non-matching suffix portions of the word are equated. The process is repeated for each of the N words which form the list of champions. An example of this process applied to the word inhibiting for the medical knowledge domain may produce the following results:

| Word | Rule |
|---|---|
| inhibiting | " "<->" " |
| inhibit | "<->"ing" |

| Word | Rule |
|---|---|
| inhibits | "s"<->"ing" |
| inhibition | "on"<->"ng" |
| potent | |
| resulted | |
| inhibited | "ed"<->"ing" |
| exerted | |
| enhances | |
| manner | |
| inhibitory | "ory"<->"ing" |
| induced | "duced"<->"hibiting" |
| prevented | |
| enhanced | |
| investigated | "vestigated"<->"hibiting" |
| completely | |
| similarly | |
| effect | |
| pretreated | |
| neither | |
| markedly | |
| ic50 | 'c50'<->'nhibiting' |
| nor | |
| pretreatment | |

The rules which appear in the right column are those which were generated by equating some number of characters in the terminal portion of the word inhibiting with non-matching characters in words from the list of champions. Where there are no matching characters in the word and a word from its list of champions, such as the words potent, resulted, exerted, etc., no rule was generated. As seen, this procedure generated some very good rules, such as, the common English rules "s" <-> "ing" and "ed" <-> "ing", as well as some obscure but still good rules such as "ory" <-> "ing" and "on" <-> "ng". Besides generating good rules, it also generated several incorrect rules such as "duced" <-> "hibiting" and "c50" <-> "nhibiting". However, an incorrect rule like "c50" <-> "nhibiting" may be assumed to happen only once or at most a small number of times during the process. This provides a way to discriminate between valid and non-valid rules.

The foregoing process is repeated for each word in the dictionary, and the resulting rules which are produced are ranked by their frequency of occurrence. It has been found that valid rules, i.e., those which correctly produce equivalency, will repeat, far more frequently than invalid rules. Thus, good rules are obtained by selecting a predetermined number of rules, e.g., 500, which are at the top of the rank order list, and rejecting the remaining lower frequency rules. This approach has been found to yield a correct set of rules which are appropriate to the particular knowledge domain from which they were generated.

Table 3, below, is an example of a list of voted rules generated from the corpus of medical documents, sorted by frequency counts:

TABLE 3

| SUFFIX RULES | COUNT |
|---|---|
| " "<->"s" | 5191 |
| "ed"<->"ing" | 519 |
| "ed"<->"ion" | 384 |
| " "<->"ly" | 366 |
| " "<->"d" | 343 |
| "e"<->"ing" | 275 |
| " "<->"ing" | 273 |
| "a"<->"c" | 263 |
| " "<->"ed" | 228 |

TABLE 3-continued

| SUFFIX RULES | COUNT |
|---|---|
| " "<->"al" | 226 |
| "ic"<->"y" | 214 |
| "ation"<->"ed" | 188 |
| "sis"<->"tic" | 174 |
| " "<->"l" | 170 |
| " "<->"ally" | 164 |
| "ng"<->"on" | 152 |
| "1"<->"2" | 148 |
| "d"<->"s" | 148 |
| " "<->"1" | 135 |
| "es"<->"ing" | 132 |
| "on"<->"ve" | 127 |
| "ing"<->"s" | 126 |
| " "<->"es" | 125 |
| " "<->"ic" | 110 |
| "al"<->"s" | 107 |
| "ed"<->"s" | 106 |
| " "<->"ity" | 104 |
| " "<->"r" | 104 |
| "e"<->"ion" | 102 |
| "al"<->"um" | 100 |
| " "<->"2" | 97 |
| " "<->"a" | 94 |
| "a"<->"b" | 91 |
| "ies"<->"y" | 91 |
| "al"<->"e" | 86 |
| "ate"<->"ic" | 86 |
| " "<->"e" | 85 |
| "ical"<->"y" | 84 |
| "aemia"<->"emia" | 82 |
| "e"<->"ic" | 79 |
| "ic"<->"s" | 76 |
| "ed"<->"ions" | 75 |
| "al"<->"es" | 73 |
| "es"<->"ic" | 71 |
| "ers"<->"ing" | 70 |
| "e"<->"ity" | 67 |
| "ion"<->"ory" | 67 |
| "2"<->"3" | 63 |
| "ation"<->"ing" | 63 |
| "al"<->"us" | 57 |
| "ion"<->"or" | 57 |
| "ation"<->"e" | 56 |
| "ce"<->"t" | 55 |
| "1"<->"3" | 52 |
| " "<->"b" | 52 |
| "ists"<->"y" | 52 |
| " "<->"c" | 50 |
| "aemia"<->"emic" | 49 |
| "er"<->"ing" | 45 |

Many of the above rules may appear to be unfamiliar, but they do accurately reflect the domain language from which they were derived. From a sorted list of rules by count, the first N rules, such as 300–500, may be selected as good rules.

The process is next repeated to generate prefix rules. However, instead of cutting the terminal part of a word and looking for matches in the characters at the beginning of the word with words in the list of champions, the process for generating prefix rules seeks matches in the characters which form the terminal parts of the word. It equates non-matching leading characters to generate rules. The following Table 4 is an example of the rules generated by the prefix generating process applied to the medical text, with the rules sorted by decreasing count.

TABLE 4

| PREFIX RULES | | |
|---|---|---|
| " "<->"non" | " "<->"p" | "ex"<->"in" |
| " "<->"un" | " "<->"de" | " "<->"bio" |

TABLE 4-continued

| PREFIX RULES | | |
|---|---|---|
| " "<->"post" | " "<->"c" | " "<->"f" |
| " "<->"anti" | " "<->"hydroxy" | " "<->"neuro" |
| " "<->"pre" | " "<->"m" | " "<->"para" |
| "h"<->"ya" | " "<->"o" | "hyper"<->"normo" |
| " "<->"intra" | " "<->"poly" | " "<->"endo" |
| " "<->"sub" | " "<->"hyper" | " "<->"n" |
| " "<->"di" | " "<->"peri" | " "<->"methyl" |
| " "<->"pro" | " "<->"hypo" | "di"<->"mono" |
| " "<->"pre" | " "<->"inter" | "heter"<->"hom" |
| " "<->"h" | "hyp"<->"norm" | " "<->"e" |
| " "<->"r" | " "<->"co" | " "<->"b" |
| " "<->"re" | " "<->"trans" | " "<->"dihydro" |
| "hyper"<->"hypo" | " "<->"in" | "an"<->"ana" |
| " "<->"micro" | " "<->"s" | "d"<->"tr" |
| " "<->"a" | "sulf"<->"sulph" | "inter"<->"intra" |

Having determined the appropriate lexical rules for the specific knowledge domain, the next step 40 in the process of FIG. 2 is to apply the lexical rules to each word in the dictionary to generate a list of inflections for the word. The important aspect of applying the rules to generate the list of inflections is to ensure that the inflection generated by application of a particular rule is in the list of champions for the word. For example, although there is a suffix rule that says that s may be cut out of a word, applying that rule to the word aids to obtain the word aid would be incorrect since the two words have different meanings. This may be illustrated in Tables 5 and 6 from the lists of champions for the words aid and aids.

TABLE 5

| AID | |
|---|---|
| WORD | S |
| aid | 1 |
| lipreading | 0.767911 |
| multichannel | 0.760258 |
| baha | 0.747294 |
| postlingually | 0.731344 |
| prelingually | 0.729109 |
| microphone | 0.718828 |
| audiology | 0.714637 |
| deaf | 0.712591 |
| processor | 0.703978 |
| speechreading | 0.702788 |
| disadvantages | 0.701451 |
| difficult | 0.696901 |
| programmable | 0.686254 |
| assist | 0.680205 |
| deafened | 0.678257 |
| available | 0.670911 |
| designed | 0.669829 |

TABLE 6

| AIDS | |
|---|---|
| WORD | S |
| aids | 1 |
| seropositive | 0.935014 |
| bisexual | 0.931943 |
| cdc | 0.931919 |
| seropositives | 0.929821 |
| heterosexually | 0.925142 |
| hiv | 0.921758 |
| seronegatives | 0.9205 |
| immunodeficiency | 0.91469 |

TABLE 6-continued

AIDS

| WORD | S |
|---|---|
| seronegative | 0.909228 |
| homosexual | 0.906196 |
| abidjan | 0.901711 |
| seroconverters | 0.899857 |
| perinatally | 0.898907 |
| tanzanian | 0.89537 |
| heterosexual | 0.892989 |
| bisexuals | 0.888706 |
| seropositivity | 0.881187 |

From the above Tables 5 and 6, it can be seen that the words aid and aids are associated with completely different vocabularies. Thus, lexical rules should be applied only to words that belong to each other's lists of champions, i.e., words that are close in meaning.

An example of inflection lists resulting from the rules applied to medical documents might be as shown in the following Table 7:

TABLE 7 treated, treatments, treatment, treating, treat
expressed, expressing, expression, express, expresses
control, controlled, controlling, controls
analysed, analyzed, analysis, analyses
tumorous, tumoral, tumors, tumor, tumoural, tumours, tumour
infective, infected, infecting, infections, infection, infects, infect
antigenicity, antigenic, antigens, antigen
hospitalisation, hospitalised, hospitalizations, hospitalization, hospitalized, hospitals, hospital There are two principal benefits from using inflection lists. First, search quality is increased when words are known to have similar meanings, e.g., knowing that tumor is also tumorous, tumoral, tumors, tumor, tumoural, tumours, tumour. Second, since many significant words do have inflections by dealing with the words' inflections rather than with individual words, the size of the dictionary and the computational complexity of the next phrase generation part of the process of FIG. 2 are greatly reduced. Dictionary size may be reduced, for example, from 70,000 single words to only 54,389 inflections, which is close to a 25% size reduction.

The invention also achieves a significant increase in precision and accuracy by including not only words but also phrases in the decision-making process of classifying a document. Part of the lack of precision which characterizes many conventional classification methods is due to both word ambiguity as well as to the failure to consider the large quantity of information that is present by examining words in proximity to one another. Such information which is missed by viewing words in isolation is used to advantage by the invention. The invention, by considering phrases as well as words, substantially increases the precision and accuracy of classification [over conventional automated classification approaches].

A phrase may be any number of words which remain adjacent to one another in the text. For the purposes of the invention, a phrase may comprise two adjacent words. Although a greater number of words than two could be used as a phrase (using three, for example, increases accuracy and precision), using more than two words increases the processing burden. It has been found that acceptable accuracy and precision can be obtained by considering phrases of only two adjacent words. The invention processes phrases by applying the same approach used for words, i.e., it determines the statistical significance of the phrase to a cluster. Since there are a large number of distinct phrases in text, in order to reduce the computational burden of looking at all of them, the invention generates phrases for analysis in such a way that only those phrases which occur above some threshold number of times (such as four times) are considered to be of significance and are selected for processing.

The selected phrases are processed in the same manner as words are processed, as indicated in FIG. 2, in order to determine their significance in a cluster. For the selected phrases, the phrases are processed to determine which have positive significance in a cluster C by repeating the processing steps 30, 32 and 34 applied to phrases instead of words to produce a resulting matrix $M_{PC}$ with corresponding statistical characteristics $P_{C,D}$ and $I_{C,D}$ for each cluster.

To generate phrases, the invention first examines the text and deletes all the stop words (e.g., syntactic words, such as "a," "the," "that," "what," etc.). Then the text is examined again and each word is replaced with its inflection identifier ID. Phrases in the text are generated, and the number of occurrences of each is determined. Phrases that occur less than some threshold number, e.g., 4, are deleted. The remaining phrases are then analyzed.

For the set of phrases derived above and for a cluster C, the invention determines phrases that are significant in C as follows:

$P_T$—is the number of occurrences of phrase P in the corpus T, and $P_C$—is the number of occurrences of phrase P in the cluster C. Then the normal deviate of P in C, which measures the significance of the phrase P in cluster C is:

$$Z_{Pc} = \frac{Pc - \mu}{\sigma} \quad (20)$$

where:

$$\mu = |C|\frac{P_T}{|T|} - 0.5 \quad (21)$$

$$\sigma = \sqrt{|C|\frac{P_T}{|T|}\left(1 - \frac{P_T}{|T|}\right)\frac{|T| - |C|}{|T| - 1}} \quad (22)$$

For this analysis, the size of cluster |C| is measured in phrases not in words. The number of phrases is computable by taking every two adjacent words in the text. If $Z_{P_c} > 5$, P is assumed to be significant in C and the corresponding value of $Z_P$ is said to be the weight of P in C.

The only difference in the statistical characteristics are that they are computed for phrases rather than for single words. The phrase matrix and its statistical signatures are then placed in the knowledge base 22.

Having built a knowledge base, the knowledge base may then be used for different applications. These include, for example, classification, finding key terms, and generating relevant phrases and terms. These three applications of the invention will be described in order to illustrate its broad utility and advantages. These are, however, merely illustrative of the utility of the invention, and do not represent an exhaustive description of its possible applications.

Figure 7:
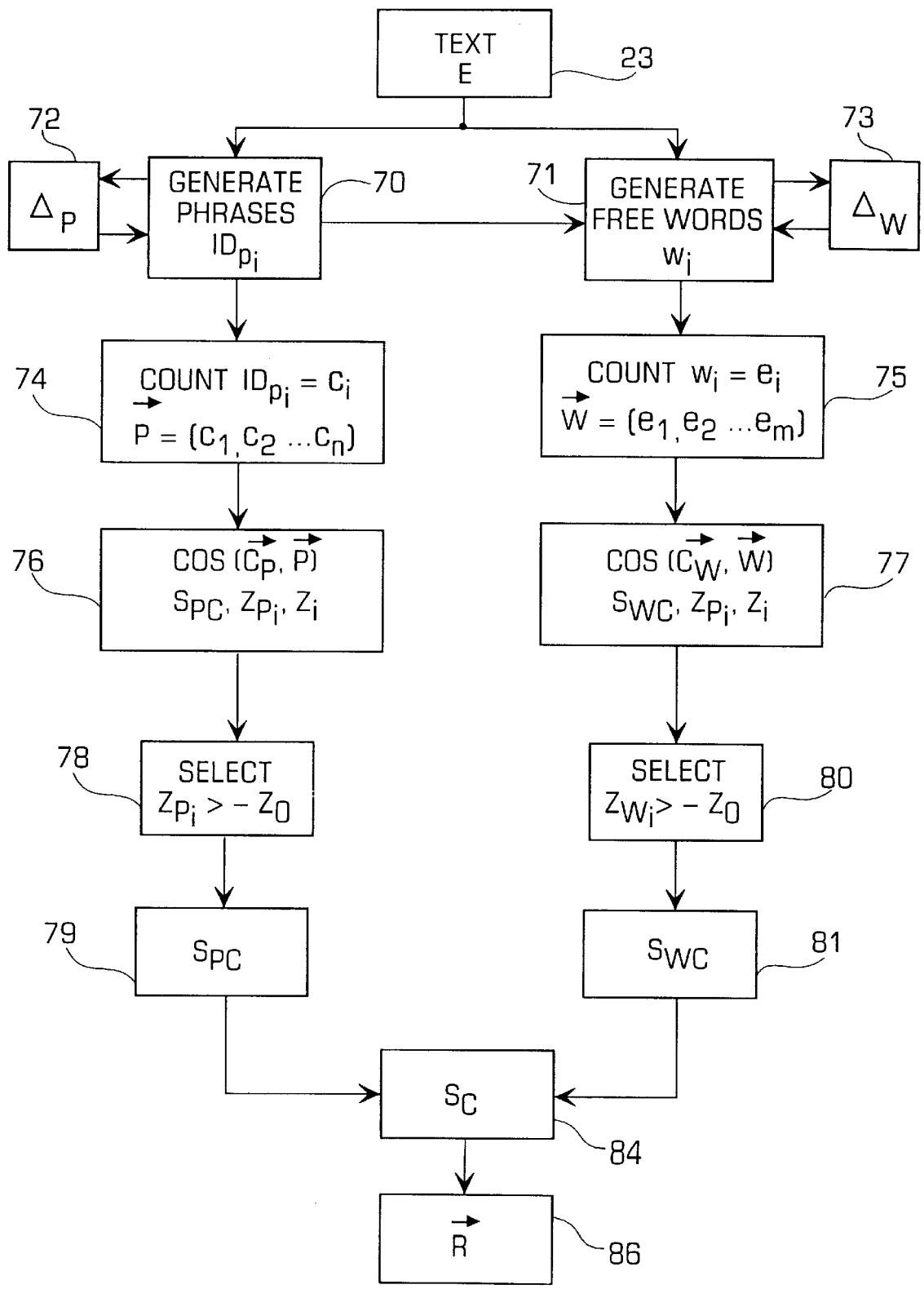
FIG. 7 is a flow diagram illustrating the classification of text entities in accordance with the invention.

Classification is an application of the invention to a textual entity (E) 23 (see FIG. 1), such as a document, a group of terms which form a block of text, or a sequence of terms used as a search string, etc. The objective of the classification process is to map or classify the text into certain predetermined classifications or clusters to which the text is relevant. The classifications resulting from the process may be sorted into a vector of clusters $\vec{R}$. The value of a cluster in $\vec{R}$ represents the relevance of that particular cluster to the text. FIG. 7 gives an overview of the classification process for a text entity (E) 23.

Figure 8:
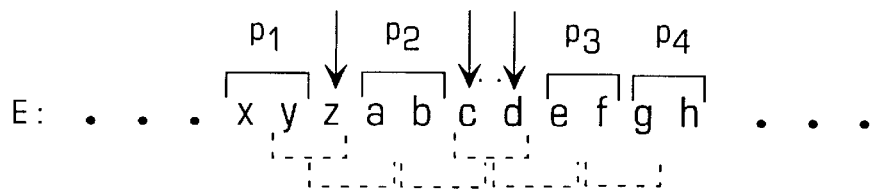
FIG. 8 is a diagramatic view illustrating the generation of phrases and free words.

The classification process begins by first removing stop words from the text entity. Next, as shown in FIG. 7, the text is processed at step 70 to generate phrases and at step 71 to generate free words. Phrase generation is accomplished using the dictionary of significant phrases $\Delta_P$ 72 from the knowledge base, and free word generation is accomplished using the dictionary of significant words $\Delta_W$ 73 from the knowledge base. Free words are generated after phrases are generated. Free words are words which are unassociated in phrases but which otherwise appear in the dictionary $\Delta_W$. FIG. 8 illustrates diagrammatically this process of generating phrases and free words.

The phrase dictionary $\Delta_P$ in the knowledge base stores phrases by identifiers $ID_{pi}$ which designate the phrases. To generate phrases from the text entity E, the text is first scanned and adjacent pairs of words are converted into a corresponding phrase ID using the phrase dictionary. For example, as shown in FIG. 8, assuming that the text entity comprises a string of words "... x y z a b c d e f g h ...", a sliding two-word window is used to select a pair of adjacent words, and the dictionary is used to determine whether the selected word pair constitutes a phrase which is in the dictionary. For example, assume that x y is identified as a phrase $p_1$, a b is identified as a phrase $p_2$, and e f and g h are respectively identified as phrases $p_3$ and $p_4$. For these phrases, identifiers $ID_{pi}$ are assigned to each of the identified phrases at step 70. The words which are not associated with a phrase in the text, e.g., z, c and d (indicated by arrows in FIG. 8) are free words W. The identified phrases and free words in the text entity are counted, and the number of occurrences of each will form the element values of a phrase vector $\vec{P}$ (step 74) and a word vector $\vec{W}$ (step 75). The next step of the process is to determine for every cluster $C_i$ having a cluster word vector $\vec{C}_{Wi}$ of significant positive words in the cluster and a phrase vector $\vec{C}_{Pi}$ of significant phrases in the cluster, the relevance of the text entity to each cluster by determining a cluster score:

$$S_C = S_{PCi} + S_{WCi} \quad (23)$$

for phrases and words respectively, and by determining cluster distributional values $Z_{P_{C,D}}$ and $Z_{I_{C,D}}$, using equations (10)–(12) and equations (14)–(18) for both free words and phrases. These are illustrated at step 76 for the phrases and at step 77 for the words in FIG. 7.

Figures 9, 10:
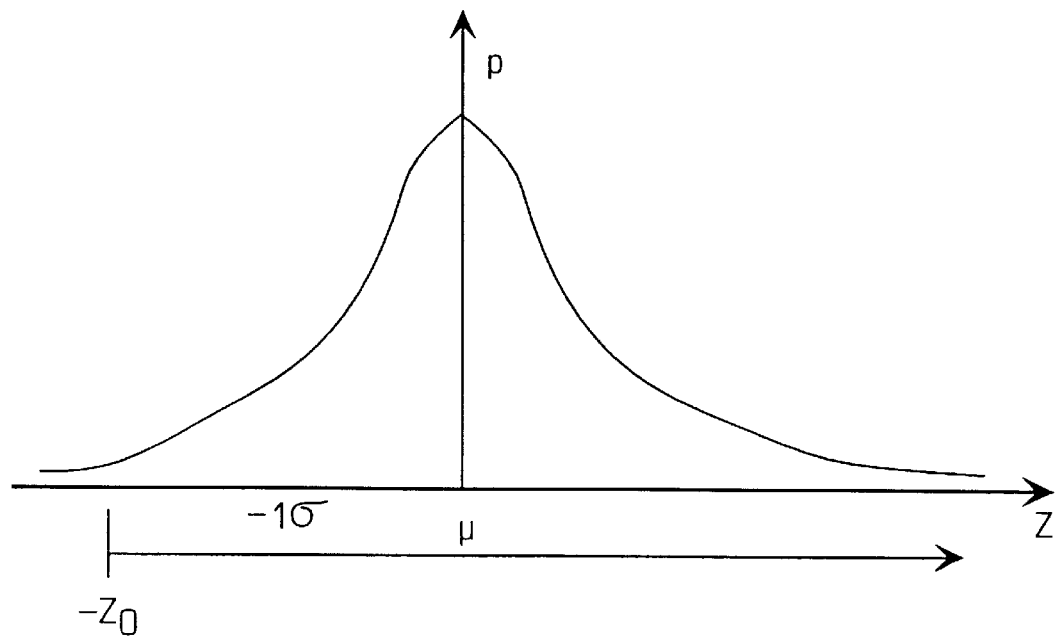
FIG. 9 is a diagramatic view illustrating the manner in which similarity scores are determined between vectors of phrases and text and clusters.
FIG. 10 illustrates a singly bounded standard normal probability distribution curve.

FIG. 9 illustrates, for phrases, the way in which the phrase cluster score $S_PC_i$ is determined for a cluster. As shown, the phrase vector $\vec{P}$ produced in step 74 comprises a vector which has as element values the number of occurrences, $c_i$, of each phrase from the phrase dictionary $\Delta_P$ in the text entity E. If a phrase does not appear in the text, the corresponding entry in the $\vec{P}$ vector is set at zero, as shown, for example, for phrases $p_2$, $p_5$, and $p_n$ in FIG. 9. For a cluster $C_i$ from the phrase matrix $M_{PC}$ (FIG. 3B), a corresponding cluster phrase vector $\vec{C}_{PI}$ of $Z_P$ weights is multiplied element-by-element with the phrase vector $\vec{P}$ to produce a weighted product phrase score for that cluster. The process is repeated with the $Z_I$ values to produce an intersection. The result of this process is a score for each element $S_{PCi}$, as shown. The distributional values for the cluster, $Z_{P_{C,D}}$ and $Z_{I_{C,D}}$ are determined from equations (10)–(112) and (14)–(18). The standard normal variables Z which are calculated are compared to a singly bounded standard normal distribution (see FIG. 10) to filter those clusters having values which fall below a preselected threshold value $-Z_0$. The threshold may be, for example, set a value of $-2$. This is illustrated in step 78 of FIG. 7. Clusters with Z values which fail to exceed this threshold are eliminated from further consideration. The result of this process is to produce a phrase score $S_{PC} = \cos(\vec{C}_P, \vec{P})$.

Figure 11:
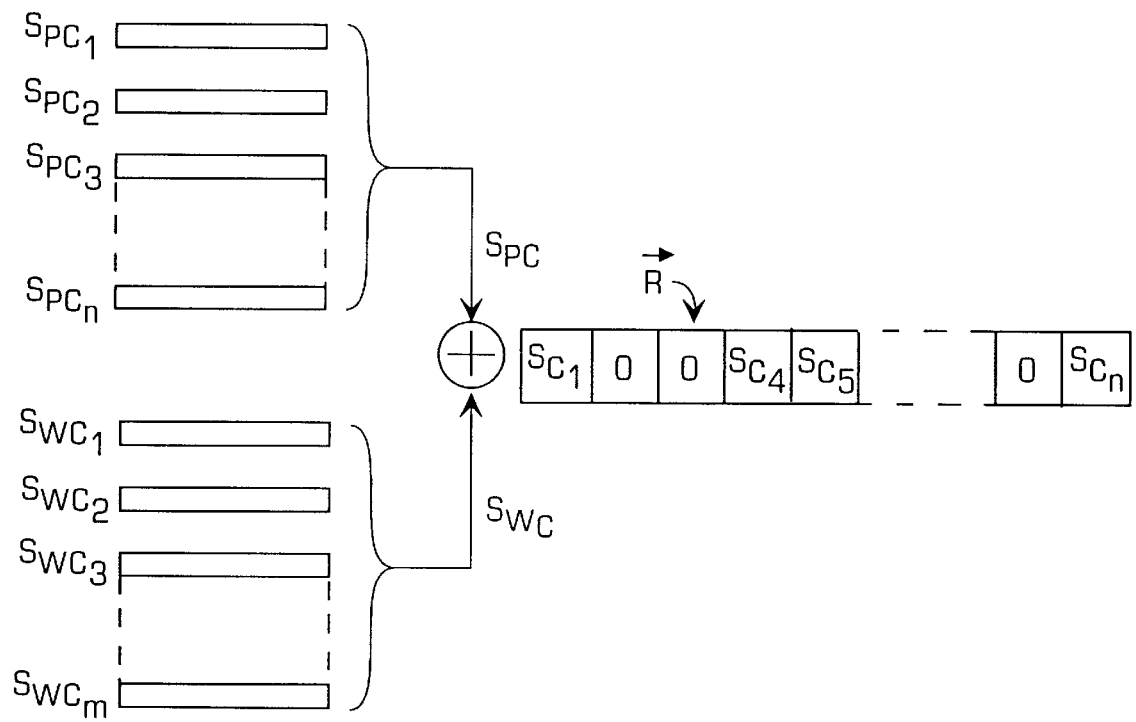
FIG. 11 is a diagramatic view illustrating the formation of a vector of cluster scores.

A similar process is then performed for the word vector $\vec{W}$ to produce a word score $S_{WC}$ at 81. The phrase and word scores are then combined as per equation (23) to produce a cluster score, as indicated at 84. The cluster scores are combined to form a vector of cluster scores as shown diagrammatically in FIG. 11. Cluster scores are ranked in descending order to produce the sorted vector of clusters $\vec{R}$ at 86. The classifications for the text may be selected as the top N clusters in the vector. N may be taken as 5, for example, so that the text is classified in the five clusters to which it is most relevant.

Having determined the classification vector $\vec{R}$ as just described, the invention may be used to identify the key terms in the text entity E which resulted in the classifications which were assigned to that text entity. From the classification vector $\vec{R}$, the first N' elements, e.g., 20, may be used to determine that number of key terms in the text. Then, for every phrase P found in the text, its relevance in respect to $\vec{R}$ is computed. Each row of the phrase matrix $M_{PC}$ (FIG. 3B) is a vector of clusters in which the phrase of the row had positive significance. Thus, a phrase vector $\vec{V}_P$ comprising a vector of clusters in which P had positive significance is constructed. The weights of the elements of the vector are equal to $Z_{P,C}$ in each cluster. This vector is equivalent to a row in $M_{P,C}$ in the phrase matrix of FIG. 3B.

Similarly, a word vector $\vec{V}_W$, comprising a vector of clusters in which a word W had positive significance and with the elements of the vector equal to weights of clusters $Z_{W,C}$ in each cluster can be constructed. To find phrases that best match $\vec{R}$, for every phrase in the text entity compute the score of the phrase with respect to $\vec{R}$. Next, phrases are sorted by their scores and the top N of the sorted list of phrases are taken. The same process is repeated for free words. The resulting list of selected phrases and free words is a list of key terms (words and phrases) in the text entity E that resulted in it being classified in those particular clusters.

The invention may also be used to generate a set of relevant terms for a selected set of one or more clusters to indicate which terms are important in order for text to be classified into those clusters. This may be useful, for example, for identifying key words or phrases for a search for documents which would be relevant to the subject matter and text already classified in the selected set of clusters. This may be done as follows.

For some text, start with the classification process described above and construct a vector $\vec{R}$. Then generate a list of phrases and words relevant to $\vec{R}$ regardless of the initial text (which could be a single word by the way). To do that, the computation outlined in the key term process above is performed, except that instead of extracting phrases from the given text, all of the phrases that had positive significance in any of the clusters in $\vec{R}$ are analyzed. To generate relevant phrases for every cluster in $\vec{R}$ select all the phrases in the cluster and add them to a set K. Next, for every phrase P in K, compute its score in respect to $\vec{R}$ is determined as:

$$S_{\vec{P},\vec{R}} = \cos(\vec{R},\vec{V}_P) \qquad (24)$$

Next, phrases are sorted by their scores, and the N best ones are selected. The same process is repeated for words. The resulting list of selected phrases and words is a list of words and phrases relevant to the cluster.

As may be appreciated from the foregoing, the invention affords a highly useful and powerful process for processing text that may be used in a number of different contexts. It has been found, for example, that the invention provides a substantial increase in accuracy and precision over conventional text processing systems and methods, and represents a significant improvement over these conventional systems and methods. Thus, the invention affords a highly advantageous machine-implemented process which is capable of accurately processing large volumes of text.

While the foregoing description has been with reference to particular embodiments of the invention, it will be appreciated by those skilled in the art that changes in these embodiments may be made without departing from the principles and spirit of the invention, the scope of which is defined in the appended claims.

I claim:

1. A method of automatically classifying a text entity which comprises a plurality of terms into one or more clusters of a plurality of clusters which characterize a corpus of text in corresponding subject areas, each cluster having a plurality of text entities related to a particular corresponding subject area, the method comprising forming a list of terms sorted by order of occurrence from the corpus; determining, for each of the clusters, a value of statistical weight of significance of terms of the list in said each cluster by examining distributions of the terms inside of the cluster and outside of the cluster, said determining comprising calculating a weight of significance of terns in said each cluster, and assigning a weight of zero to terms which are not statistically significant in said each cluster; constructing a vector for each cluster, the vector having element values corresponding to the weights of significance of the terms in the cluster; calculating for each cluster from its corresponding vector statistical signatures of the cluster; determining from the statistical signatures a score for the text entity for each cluster indicating the relevance of the text entity to the cluster; and classifying the text entity into one or more clusters based upon said scores.

2. The method of claim 1, wherein said calculating said weight of significance comprises calculating a standard normal variable of a standard normal probability distribution for each term; and wherein said assigning comprises using as said weights calculated values of the standard normal variable which correspond to a low probability of occurrence of a term in a cluster due to a random distribution, and otherwise assigning to a term a weight of zero.

3. The method of claim 1, wherein said statistical signatures comprise a sum of weighted products corresponding to the products of the number of occurrences of terms in the text entity and the corresponding weights of significance of the terms in the cluster, and an intersection sum corresponding to the number of occurrences in the text entity of terms having weights of significance greater than a predetermined threshold.

4. The method of claim 3, wherein said predetermined threshold is selected to be zero such that the intersection represents terms which have positive significance in said text entity.

5. The method of claim 4 further comprising determining using said intersection sum whether the occurrence of terms in a cluster having positive significance is due to chance by determining the value of a standard normal variable which characterizes the intersection of terms in the cluster, and assigning the text entity to the cluster when the value of said standard normal variable exceeds a predetermined value.

6. The method of claim 1 further comprising forming a matrix of weights of significance of each term in each cluster; comparing pairs of terms to generate similarity values for each term, the similarity values measuring semantic similarity between terms; selecting for each term a list of champions by rank ordering terms which are semantically close to said term according to similarity value, and selecting as champions a number of terms which exceed a predetermined number.

7. The method of claim 6, wherein said terms comprise words, and the method further comprises generating lexical rules by identifying sequences of characters in a first part of a word which match sequences of characters in words in said list of champions, equating non-matching sequences of characters in words, rank ordering said equated non-matching sequences by frequency of occurrence to generate lexical rule candidates, and selecting as lexical rules a predetermined number of rules from said rank ordering.

8. The method of claim 7 further comprising applying said lexical rules to words in said corpus to generate lists of inflections, said inflections comprising words having the same meaning; assigning a common identifier to all words in an inflection list which have the same meaning; substituting for each word in said corpus its corresponding identifier; inspecting pairs of identifiers corresponding to adjacent words to generate phrases; determining the weight of significance of the phrases in each cluster; and using said weights of significance of phrases to calculate said statistical signatures of the clusters.

9. A method of automatically classifying a document which comprises a plurality of words and phrases into one or more clusters of a plurality of clusters which characterize a corpus of text in corresponding subject areas, each cluster having a plurality of documents related to a particular corresponding subject area, the method comprising calculating, for each of the clusters, values of a statistical weight of significance of distributions of the words and phrases in the cluster and in a complement of the cluster, and assigning a value of zero to the weights of words and phrases which are not statistically significant in the cluster; calculating using the values of the weights of significance of the words and phrases in each cluster statistical signatures of the cluster, said statistical signatures comprising sums of weighted products and intersections of words and phrases in the cluster; determining from the statistical signatures cluster scores for the document representing the relevance of the document to each cluster; and classifying the document into one or more clusters based upon said scores.

10. The method of claim 9, wherein said calculating values of statistical weight of significance comprises calculating values of a standard normal variable of a standard normal probability distribution for each word and phrase, and said assigning comprises assigning a value of zero to the weights of words and phrases which are not statistically significant in a cluster, and wherein said sum of weighted products comprises the products of the numbers of occurrences of words and phrases in the document and the corresponding weights of significance of the words and phrases, and the intersection sum comprises the number of occurrences in the document of words and phrases having weights of significance greater than a predetermined threshold.

11. A system for automatically classifying a text entity which comprises a plurality of terms into one or more clusters of a plurality of clusters which characterize a corpus of text in corresponding subject areas, each cluster having a plurality of text entities related to a particular corresponding subject area, the system comprising a classifier having means for determining for a selected term in a text entity to be classified and for each cluster a probability distribution of the selected term in the cluster and in a complement of the cluster; means for assigning a weight of zero to terms which are not statistically significant in the cluster; means for calculating a statistical score for the cluster from the non-zero weights of significance of terms in the cluster; and means for classifying the text entity into one or more clusters based upon said score.

* * * * *